United States Patent [19]

Johnson et al.

[11] Patent Number: 4,551,436

[45] Date of Patent: Nov. 5, 1985

[54] FABRICATION OF SMALL DENSE SILICON CARBIDE SPHERES

[75] Inventors: Curtis A. Johnson, Schenectady; Gary M. Renlund, Scotia; Charles E. Van Buren, Schenectady; Svante Prochazka, Saratoga, all of N.Y.

[73] Assignee: General Electric Company, Schenectady, N.Y.

[21] Appl. No.: 599,033

[22] Filed: Apr. 11, 1984

[51] Int. Cl.$^4$ .............................................. C04C 35/56
[52] U.S. Cl. ........................................ 501/90; 501/88; 264/6; 264/63; 264/65
[58] Field of Search ................. 501/88, 90; 264/6, 63, 264/65

[56] References Cited

U.S. PATENT DOCUMENTS

| 4,004,934 | 1/1977 | Prochazka | 501/90 |
| 4,041,117 | 8/1977 | Prochazka | 501/90 |
| 4,133,689 | 1/1979 | Stroke | 501/88 |
| 4,144,207 | 3/1979 | Ohnsorg | 501/90 |
| 4,179,299 | 12/1979 | Coppola et al. | 501/90 |
| 4,233,256 | 11/1980 | Ohnsorg | 264/63 |
| 4,312,954 | 1/1982 | Coppola et al. | 501/90 |
| 4,455,385 | 6/1984 | Prochazka | 501/90 |

Primary Examiner—Mark L. Bell
Attorney, Agent, or Firm—Jane M. Binkowski; James C. Davis, Jr.; James Magee, Jr.

[57] ABSTRACT

Spherical particles of polycrystalline silicon carbide having a density greater than 80% of the theoretical density for silicon carbide and having an average diameter ranging from about 10 microns to about 5000 microns are produced by forming spherical agglomerates of a sinterable silicon carbide powder and sintering the agglomerates at a temperature ranging from about 1900° C. to about 2300° C.

30 Claims, No Drawings

FABRICATION OF SMALL DENSE SILICON CARBIDE SPHERES

The present invention is directed to the production of spheres of polycrystalline silicon carbide having a density greater than 80% of the theoretical density for silicon carbide and ranging in diameter from about 5 microns to about 10,000 microns and ranging in average diameter from about 10 microns to about 5000 microns.

The chemical and physical properties of silicon carbide make it an excellent material for both low and high temperature structural applications. These properties include good oxidation resistance and corrosion behavior, high thermal conductivity, low thermal expansion coefficient, high thermal shock resistance and high strength at elevated temperature. This unique combination of properties suggests the use of silicon carbide as components for gas turbines, valve components for handling corrosive liquids and gases, linings of ball mills, heat exchangers and refractories for high temperature furnaces, pumps for die casting machines and combustion tubes.

U.S. Pat. No. 4,004,934, assigned to the assignee hereof and incorporated herein by reference, discloses the production of a sintered silicon carbide ceramic article by forming a dispersion of silicon carbide, a boron additive equivalent to about 0.3 to 3.0% by weight of boron, and elemental carbon or a carbonaceous additive in an amount equivalent to 0.1 to 1.0% by weight of elemental carbon, shaping the dispersion into a body, and sintering the body in an atmosphere chemically-inert with respect to silicon carbide at or below atmospheric pressure at from about 1900° C. to about 2100° C. until the ceramic article has a density of at least 85% of theoretical.

U.S. Pat. No. 4,041,117, assigned to the assignee hereof and incorporated herein by reference, discloses the production of a silicon carbide sintered body by providing a particulate mixture composed of $\beta$-SiC and from 0.05% to 5% by weight of $\beta$-SiC having a particle size of at least about twice as large as that of said $\beta$-SiC particles, an additive of boron or boron carbide equivalent to 0.3% to 3.0% by weight of boron and free carbon or a carbonaceous organic material equivalent to 0.1% to 1.0% by weight of free carbon, said carbonaceous organic material completely decomposing at from about 50° C. to 1000° C. to free carbon and gaseous products of decomposition, shaping the mixture into a green body, and sintering the green body at from about 1950° C. to 2300° C. in an atmosphere in which it is substantially inert at or below atmospheric pressure to produce a sintered body having a density of at least 80% of the theoretical density for silicon carbide and containing $\alpha$-SiC in an amount of at least 70% by weight.

U.S. Pat. Nos. 4,144,207 and 4,233,256 disclose forming a mixture of a sinterable silicon carbide material, a thermoplastic resin and an oil or a wax, injection molding the mixture to produce a molded product, removing said thermoplastic resin by baking said molded product at a temperature between about 450° C. and about 1000° C. to produce a porous baked product and sintering the baked product between about 2000° C. and 2200° C. to produce a sintered product.

U.S. Pat. No. 4,312,954 discloses a sintered body produced by pressureless sintering at about 1900° C. to 2500° C., a preshaped object which is comprised of from about 91 to about 99.35 parts by weight silicon carbide containing at least 5% by weight of $\alpha$-silicon carbide, from about 0.67 to about 20 parts by weight of an organic solvent soluble organic material carbonizable to provide carbon having a carbon content of from about 25 to 75% by weight, from about 0.15 to 5 parts by weight of a boron source containing 0.15 to 3 parts by weight boron and from about 5 to 15 parts by weight of temporary binder.

Spray drying and cascading or rolling are known procedures for spheroidization of ceramic powders. Cascading is used for agglomeration to larger sphere sizes than normally obtained by the spray drying technique. Spray drying is a popular method of preparing ceramic powders for uniaxial or isostatic pressing into shaped powder compacts for subsequent sintering. Spray dried powder is in the form of small spherical agglomerates, each composed of many powder particles in a relatively weak state of agglomeration that allows the spheres to be crushed during the powder compaction step. The spheres are uniform and reproducible in green density and distribution of binders and additives. In addition, the spherical shape of the agglomerates results in a "flowable" powder that can be poured and gravity fed without macroscopic bridging, clumping or caking.

Sintered spray dried spheres of ceramics are used currently for fabricating proppants for tight natural gas wells and some oil wells. Proppants are pumped into cracks and fissures in rock strata where the hard ceramic is used to hold the crack open allowing gas or oil to escape into the well. Spherical shapes are needed for strength and flow properties into rock fissures. Most commercial proppants range in size from 450–800 microns. Materials used for fabrication of proppants are bauxite and mullite or compositions of alumina and silica.

In accordance with the present invention, small spherically-shaped particles of dense SiC are made by two processes. The first involves the spray drying of sinterable SiC powder to form spherical agglomerates of powder that can be sintered to high density in relatively deep beds without damaging the spherical shape of the particles and without adjacent spheres bonding strongly to each other during the sintering process. The second method involves the creation of spherical agglomerates of sinterable SiC powder by a cascading or rolling process in a rotating container where the resulting agglomerates can also be sintered to high density.

The present small spherically-shaped or nominally spherically-shaped particles of dense polycrystalline SiC are useful for many applications such as catalytic support media; regenerative heat exchanger media and special purpose milling media. The relatively large quantities of spherical SiC particles needed for such applications requires economical methods for fabrication. The present particle is also useful as a point for a ballpoint pen.

Briefly stated, the present invention for producing sintered spherical or nominally spherical particles of polycrystalline silicon carbide having a density greater than 80% of the theoretical density for silicon carbide and having a diameter ranging from about 5 microns to about 10,000 microns and an average diameter ranging from about 10 microns to about 5000 microns comprises forming spherical or nominally spherical agglomerates of sinterable silicon carbide powder, said sinterable silicon carbide powder having an average particle size which is submicron and which is comprised of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of free carbon, a carbonaceous organic material which completely decomposes at a temperature ranging from 50° C. up to 450° C. to free carbon and gaseous product of decomposition, and mixtures thereof, and sintering said agglomerates at a temperature ranging from about 1900° C. to about 2300° C. at about or below atmospheric pressure in a vacuum or atmosphere which has no significant deleterious effect thereon, said agglomerates having a size which produces said sintered polycrystalline particles.

By spherical or nominally spherical particles of polycrystalline silicon carbide herein it is meant that the particle is shaped like a sphere, i.e. it is spherical or nearly spherical. More specifically, the present polycrystalline particle is round or nearly round, i.e. its shape does not differ significantly from the shape of a sphere.

The present sinterable silicon carbide powder is comprised of a homogeneous or substantially homogeneous dispersion or mixture having an average particle size which is submicron, preferably having an average particle size which ranges from about 0.05 micron up to about 1 micron, and which consists essentially of silicon carbide, a boron additive selected from the group consisting of boron and boron carbide in an amount equivalent to from about 0.3% by weight to about 3% by weight of boron based on said silicon carbide, and a carbonaceous additive selected from the group consisting of free carbon, a carbonaceous organic material which completely decomposes at a temperature ranging from 50° C. up to 450° C. to free carbon and gaseous product of decomposition, and mixtures thereof. The carbonaceous additive is used in an amount equivalent to from about 0.1% to about 5% by weight of free carbon based on said silicon carbide.

The silicon carbide powder used in the present invention is α-silicon carbide, β-silicon carbide and mixtures thereof. Preferably, the oxygen content of the silicon carbide powder is less than about 0.4 weight %.

The boron additive is elemental boron, boron carbide or a mixture thereof. The amount of boron additive is equivalent to from about 0.3% to about 3.0% by weight of elemental boron, e.g. about 0.3 part by weight to about 3 parts by weight of elemental boron based on 100 parts by weight of silicon carbide. The particular amount of boron additive used is determinable empirically and depends largely on the degree of dispersion achieved in the mixture since the more thoroughly it is dispersed the more uniform is the density of the sintered product.

The carbonaceous additive is used in an amount equivalent to from about 0.1% by weight to about 5% by weight of free carbon, e.g. about 0.1 part by weight to about 5 parts by weight of free carbon based on 100 parts by weight of silicon carbide. Preferably, the carbonaceous additive is used in an amount equivalent to from about 0.1% by weight to about 2% by weight of free carbon, and most preferably from about 0.1% by weight to about 1% by weight of free carbon, based on silicon carbide. The particular amount of free carbon is determinable empirically and depends on such factors as the degree to which it is dispersed in the powder as well as the oxygen, $SiO_2$ and Si contents of the starting powder with which it reacts and the final density desired in the sintered product.

The carbonaceous additive can be particulate free carbon of submicron size such as, for example, acetylene black, and/or a carbonaceous organic material which is heat-decomposible to produce particulate free carbon of submicron size. If desired, free carbon in the form of a submicron powder can be admixed with the silicon carbide powder by a number of conventional techniques such as, for example, jet milling or ball milling in a liquid dispersion.

The carbonaceous organic material is a solid or liquid at room temperature and completely decomposes at a temperature in the range of 50° C. up to 450° C. to yield free carbon and gaseous product of decomposition. Also, the carbonaceous organic material is one which has no significant deleterious effect.

The carbonaceous organic material can be introduced by a number of techniques. The carbonaceous organic material which functions as a source of free carbon can be pyrolyzed before or after the agglomerate is formed. The carbonaceous organic material which functions as a binder is pyrolyzed after the agglomerate is formed. If the carbonaceous organic material is a solid, it is preferably admixed in the form of a solution with the silicon carbide powder and boron additive to substantially coat the particles. In one embodiment, the wet mixture can be treated to remove the solvent, for example by evaporation. In this way, a substantially uniform coating of the carbonaceous material on the silicon carbide powder is obtained which on decomposition produces a uniform distribution of free carbon. Alternatively, the wet mixture can be used to form the slurry in the present spray drying process.

Representative of the present carbonaceous organic material are high molecular weight aromatic compounds such as a phenol-formaldehyde condensate-novolak which is soluble in acetone or higher alcohols, such as butyl alcohol, as well as many of the related condensation products, such as resorcinol-formaldehyde, aniline-formaldehyde, and cresol-formaldehyde. Another group of useful organic materials are derivatives of polynuclear aromatic hydrocarbons contained in coal tar, such as dibenzanthracene and chrysene. Still another group of carbonaceous additives are polymers of aromatic hydrocarbons such as polyphenylene or polymethyl-phenylene which are soluble in aromatic hydrocarbons and yield on heat-decomposition up to 90% of free carbon.

SPRAY DRYING METHOD

Briefly stated, one embodiment of the present spray drying method for producing sintered spherical or nominally spherical particles of polycrystalline silicon carbide having a density greater than 80% of the theoretical density for silicon carbide and having a diameter ranging from about 5 microns to about 2000 microns and an average diameter ranging from about 10 microns to about 1000 microns comprises forming a slurry comprised of sinterable silicon carbide powder and a liquid medium which has no significantly deleterious effect thereon, said sinterable silicon carbide powder having an average particle size which is submicron and which is comprised of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of a carbonaceous organic material which completely decomposes at a temperature ranging from 50° C. up to 450° C. to free carbon and gaseous product of decomposition, and mixtures thereof with free carbon, spraying said slurry into droplets into a hot air spray dryer wherein said droplets are dried into spherical or nominally spherical agglomerates, at least a portion of said carbonaceous organic material being an agglomerate-forming binder in solution and/or suspension in said liquid medium in said slurry and being present in an amount at least sufficient to form said agglomerate and being at least about 1% by weight of said agglomerate, and sintering said agglomerates at a temperature ranging from about 1900° C. to about 2300° C. at about or below atmospheric pressure in a vacuum or atmosphere which has no significant deleterious effect thereon, said agglomerates being of a size which produces said sintered particles, said slurry being characterized as sprayable into droplets into a hot air spray dryer wherein said droplets are dried into said spherical or nominally spherical agglomerates.

Briefly stated, another embodiment of the present spray drying method for producing sintered spherical or nominally spherical particles of polycrystalline silicon carbide having a density greater than 80% of the theoretical density for silicon carbide and having a diameter ranging from about 5 microns to about 2000 microns and an average diameter ranging from about 10 microns to about 1000 microns comprises forming a slurry comprised of sinterable silicon carbide powder, a liquid medium and an agglomerate-forming binder in solution and/or suspension in said liquid medium, said sinterable silicon carbide powder having an average particle size which is submicron and which is comprised of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of free carbon, a carbonaceous organic material which completely decomposes at a temperature ranging from 50° C. up to 450° C. to free carbon and gaseous product of decomposition, and mixtures thereof, spraying said slurry into droplets into a hot air spray dryer wherein said droplets are dried into spherical or nominally spherical agglomerates, said agglomerate-forming binder being present in an amount of at least about 1% by weight of said agglomerate and at least sufficient to form said agglomerate, said agglomerate-forming binder being thermally removable at an elevated temperature ranging up to 450° C. leaving no significant amount thereof, and sintering said agglomerates at a temperature ranging from about 1900° C. to about 2300° C. at about or below atmospheric pressure in a vacuum or atmosphere which has no significant deleterious effect thereon, said agglomerates being of a size which produces said sintered particles, said slurry being characterized as sprayable into droplets into a hot air spray dryer wherein said droplets are dried into said spherical or nominally spherical agglomerates.

In one embodiment of the present spray drying method, the binder is comprised of the present or a portion of the present carbonaceous organic material.

In another embodiment, the binder is a material which is thermally removable at a temperature ranging up to 450° C. leaving no significant amount thereof. Also, such binder should have no significant deleterious effect. Such binder can be inorganic, such as, for example, ammonium carbonate and urea. Preferably, however, the agglomerate forming binder is an organic thermoplastic such as, for example, polyethylene glycol and methylcellulose.

The slurry is comprised of a uniform or substantially uniform dispersion, i.e. mixture, of sinterable silicon carbide powder in a liquid medium in which the binder is in solution and/or suspension. The liquid medium for forming the binder solution can be aqueous and/or organic. For example, it can be water or an alcohol such as methanol or mixtures thereof.

The particular amount of binder used is determinable empirically depending largely on its particular composition and processing conditions. The amount of binder is at least sufficient to form the spray dried agglomerate, and it is at least about 1% by weight of the agglomerate, and preferably, it ranges from about 2% by weight to about 4% by weight of the total weight of the agglomerate.

The slurry may or may not contain a surfactant. The surfactant used should have no significant deleterious effect and may be inorganic or organic, but ordinarily, it is organic. Specifically, the surfactant should be thermally removable such as, for example, by evaporation and/or decomposition, at a temperature ranging from 50° C. up to 450° C. leaving no significant amount thereof. The surfactant need only be used in an amount sufficient to produce a uniform or at least a substantially uniform slurry or dispersion. The amount of surfactant used is determinable empirically, and generally it ranges up to about 1.5% by weight, but ordinarily, it is of the order of about 0.1% by weight to about 0.2% by weight, of the solids in the slurry. Examples of useful surfactants are sodium hexametaphosphate, ammonium lignin sulfonate, and sodium lignin sulfonate.

The slurry can be formed by a number of techniques and, preferably, it is produced by ball milling the components together at ambient temperature. The amount of solids in the slurry is determinable empirically. For example, all other parameters being equal, the thicker the slurry the larger is the size of the resulting spray dried agglomerates. Generally, for spray drying, the solids range from about 30% by weight to about 55% by weight of the total weight of the slurry.

The present spray drying method can be carried out in a conventional manner with conventional spray drying equipment. The atmosphere in the spray dryer is comprised of flowing air which is sufficiently hot to produce the present spray dried agglomerates. The particular temperature or temperature range of the air drying atmosphere is determinable empirically depending largely on feed rates, nozzle size and content of solids in the slurry. For example, the inlet air temperature can range from about 300° C. to about 400° C.

Specifically, the slurry is pumped through a nozzle to separate the liquid into droplets. As the droplets travel from the nozzle toward the walls of the spray dryer, they pass through flowing, heated air. In the present spray drying, the liquid in the droplet evaporates completely, or substantially completely, before the droplet reaches the wall, i.e. the droplets are dried into spherical or nominally spherical agglomerates before hitting the wall of the spray dryer. The rate at which the slurry is pumped into the spray dryer is determinable empirically since the feed rate influences particle size and distribution. The spray dried agglomerates are generally spherical in shape with a size that is determined by the slurry viscosity, spraying pressure and nozzle design. The uniformity of agglomerate size is determined by the nozzle design and rate of spraying. The green density of the powder within the spray dried agglomerate is influenced by the solids content in the liquid slurry.

The present spray dried agglomerates are spherical or nominally spherical and range in diameter from about 6 microns to about 3000 microns and range in average diameter from about 12 microns to about 1500 microns, and frequently in average diameter from about 12 microns to about 400 microns. Generally, the present spray drying creates a moderately broad distribution of agglomerate diameters with sizes generally ranging over more than one order of magnitude from smallest to largest.

CASCADING METHOD

Briefly stated, another embodiment of the present invention for producing sintered spherical or nominally spherical particles of polycrystalline silicon carbide having a density greater than 80% of the theoretical density for silicon carbide and having a diameter ranging from about 100 microns to about 10,000 microns and an average diameter of about 250 microns to about 5000 microns comprises cascading or rolling sinterable silicon carbide powder and contacting said powder with an effective amount of a spray or mist of liquid to produce spherical or nominally spherical agglomerates, said sinterable silicon carbide powder having an average particle size which is submicron and which is comprised of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of free carbon, a carbonaceous organic material which completely decomposes at a temperature ranging from 50° C. up to 450° C. to free carbon and gaseous product of decomposition, and mixtures thereof, and sintering said agglomerates at a temperature ranging from about 1900° C. to about 2300° C. at about or below atmospheric pressure in a vacuum or atmosphere which has no significant deleterious effect thereon, said agglomerates being of a size which produces said sintered particles.

The cascading or rolling method is a spheroidization procedure. In this process, the starting material can be, for example, the sinterable silicon carbide power or spray dried agglomerates thereof. A preferred form of the starting material is dry milled and screened sinterable silicon carbide powder. After passing through the screen, the powder is in the form of irregularly shaped agglomerates of powder with the largest agglomerate size determined by the screen size.

The starting material, i.e. powder or agglomerates, is placed in a cylindrical container rolling on its side or tilted at a small angle from the horizontal. The starting quantity of powder or agglomerates should fill less than approximately 20 percent of the volume of the container. The cylinder is rotated at a speed slow enough that the material therein is not held to the inner wall by centrifugal force. The material in the container then continuously rolls or cascades down an incline made up of that material.

The process continues by slowly adding sinterable silicon carbide powder and a light spray or mist of a liquid such as water. The liquid and new powder can be added intermittently or continuously. In a commercial process, they would probably be added continuously. The liquid is used in an effective amount to form the present agglomerates. The rolling action in the presence of the liquid tends to form the powder into spherically shaped agglomerates or the agglomerates into spherically shaped or larger spherically shaped agglomerates. The added powder serves as feedstock to grow the sizes of the original particles. To encourage the growth of large spheres and/or more uniformly sized spheres, the process can be interrupted occasionally to sieve the spheres, returning only the larger spheres to the process.

The entire spheroidization process can be carried out in approximately 1 hour. The volume of the rotating cylindrical container can be scaled to quite large sizes to make the process commercially attractive. Generally, the green density of the spherical agglomerates ranges from approximately 35 to 55 percent of theoretical density for silicon carbide, depending on conditions of the process. The resulting agglomerates range in diameter from about 120 microns to about 15,000 microns and have an average diameter ranging from about 300 microns to greater than about 7500 microns, and usually from about 500 microns to about 7500 microns.

The amount of liquid used to contact the powder and/or agglomerates in the cascading method to effect formation of the present agglomerates is determinable empirically and should only be used in an amount effective to produce the present agglomerates. An amount of contacting liquid in excess of such effective agglomerating amount will cause sticking of the spheroids together. The contacting liquid is one which has no significant deleterious effect and one which evaporates at a temperature ranging from about 50° C. to about 110° C. Preferably, the liquid is water.

The liquid or water used to contact the material in the cylindrical container in the cascading method may or may not contain a surfactant. The surfactant used should have no significant deleterious effect and may be inorganic or organic, but ordinarily, it is organic. Specifically, the surfactant should be thermally removable such as for example, by evaporation and/or decomposition at a temperature ranging from 50° C. up to 450° C. leaving no significant amount therof. The surfactant need only be used in an amount effective to produce the desired wetting of the powder or agglomerates in the cylindrical container to produce the desired agglomerates. The amount of surfactant used is determinable empirically, and generally it ranges up to about 1.5% by weight, but ordinarily, it is of the order of about 0.1% by weight to about 0.2% by weight, of the contacting liquid. An example of a useful surfactant is sodium hexametaphosphate.

The agglomerates, i.e. spray dried agglomerates as well as those produced by the cascading method, are sintered in an atmosphere which has no significant deleterious effect thereon such as, for example, argon, helium or a vacuum. The sintering atmosphere can be at about or below atmospheric pressure, i.e. it can range from a substantial vacuum to or about atmospheric pressure. The sintered product is a pressureless sintered product, i.e. no mechanical pressure is applied to increase density.

Sintering is carried out at a temperature ranging from about 1900° C. to about 2300° C., and preferably from about 2000° C. to about 2100° C. The particular sintering temperature is determinable empirically and depends largely on particle size, density of the agglomerate, and final density desired in the sintered product with higher final densities requiring higher sintering temperatures. Also, lower sintering temperatures would be used with sintering atmospheres below atmospheric pressure. Specifically, the smaller the size of the particles and the higher their packing in the agglomerate, the lower is the required sintering temperature.

Preferably, the agglomerates are placed in a crucible made of a chemically compatible material such as carbon or SiC. The depth of the bed should have no significant deleterious effect such as crushing of the agglomerates at the bottom of the bed due to the weight of the agglomerates on top. Preferably, the depth of the bed of agglomerates is as deep as about 25 cm. Preferably, the firing schedule comprises a low temperature prefiring to evaporate and/or decompose binders and surfactants and is followed by a high temperature firing to sinter the spheres to high density. In order to reduce the quantity of condensable hydrocarbons, etc. in the high temperature furnace, the low temperature firing is preferably carried out in a different furnace.

The low temperature firing to remove binders and surfactants can be carried out in air or other oxidizing atmosphere if the maximum temperature is no greater than approximately 300° C. Higher temperatures in oxidizing atmospheres can oxidize the SiC, boron and/or excess carbon sufficiently to degrade the sinterability of the powder. Alternatively, the low temperature furnace cycle can be carried out in a vacuum or an inert atmosphere in which case the maximum temperature is not limited to 300° C. but it is below sintering temperature and as a practical matter ranges to about 500° C. since there is no significant advantage in using higher temperatures. After the low temperature firing, the powder, i.e. spherical or nominally spherical particles, can be handled by pouring from one crucible to another without any observable damage to the spherical shape of the particles.

A typical high temperature firing, i.e. sintering, of the present spheres involves heating to the sintering temperature of approximately 2100° C., holding at temperature for approximately 30 minutes, and furnace cooling to about room temperature, all carried out in vacuum or inert atmospheres.

The resulting sintered polycrystalline silicon carbide spheres in the crucible are generally in the form of a self-supporting mass where each sphere has partially bonded with several neighboring spheres. The mass of spheres maintains the relative shape of the inside of the crucible, but shrinkage and densification of each individual sphere has caused the mass to shrink by a comparable linear shrinkage, generally 20 to 40 percent. The bonds between neighboring spheres are relatively weak, thus allowing the mass to be hand crushed and separated into individual spheres by simply compressing and/or shearing the mass with a few pounds of force.

The resulting particles are of a shape largely determined by the shape of the original agglomerate with little or no evidence of distortion from contact with neighboring agglomerates. Agglomerates with an initially spherical shape therefore maintain a highly spherical shape when sintered. The final diameter of a given sphere ($d_f$) can be related to its initial diameter ($d_i$) through the initial or green density ($\rho_i$) and the final density ($\rho_f$) as follows:

$$\rho_i/\rho_f = (d_f/d_i)^3$$

Initial densities of most spray dried agglomerates have a practical range from approximately 20 to 50 percent of the theoretical density for silicon carbide. For a final density of 95 percent of theoretical, the resulting linear shrinkages ($1-d_f/d_i$) can therefore range from approximately 40 down to 20 percent. The final density is determined largely by the sintering temperature and the uniformity of the green density within the agglomerate. Spheres of SiC with final densities of greater than 95 percent of theoretical density have been sintered. Ceramic spheres for applications that require more uniform particle size distributions can be sized by air classification and/or sieving in the agglomerate state or in the densified state to separate and collect the size range of interest.

The present sintered spherical or nominally spherical particle or sphere has a density higher than 80%, preferably higher than about 90% and most preferably it is at least about 95% or higher of the theoretical density of silicon carbide and is comprised of silicon carbide, i.e. $\alpha$-SiC, $\beta$-SiC and mixtures thereof, and from about 0.2 part or about 0.3 part by weight to about 3 parts by weight of boron, based on 100 parts by weight of silicon carbide. The sintered polycrystalline particle can be free of detectable free carbon, i.e. uncombined carbon, but generally it contains at least a detectable amount of uncombined carbon and it can contain from less than about 0.1 part to about or up to about 5 parts, preferably less than about 0.1 part to about 2 parts, and most preferably from less than about 0.1 part to about 1 part, by weight of free carbon based on 100 parts by weight of silicon carbide. Preferably, the uncombined carbon is substantially uniformly dispersed through the sintered particle. During sintering, there may or may not be some detectable loss of boron and/or carbon.

The present sintered spherical or nominally spherical particles or spheres produced from agglomerates formed by the cascading method range in diameter from about 100 microns to about 10,000 microns and have an average diameter ranging from about 250 microns to about 5000 microns, and frequently an average diameter from about 400 microns to about 5000 microns.

The present sintered spherical or nominally spherical particles produced from spray dried agglomerates range in diameter from about 5 microns to about 2000 microns and have an average diameter ranging from about 10 microns to about 1000 microns and generally an average diameter from about 10 microns to about 250 microns.

The present polycrystalline particles are flowable.

Sn (RD-15,704), "THERMOPLASTIC MOLDING OF SINTERABLE SILICON CARBIDE" filed by G. M. Renlund and C. A. Johnson on even date herewith and assigned to the assignee hereof and incorporated herein by reference discloses a thermoplastically moldable ceramic composition comprised of from about 40% to about 60% by volume of a sinterable silicon carbide powder and a binder comprised of an organic acid and a copolymer of ethylene and from greater than about 12 weight % to about 33 weight % vinyl acetate, said organic acid having a melting point ranging from about 44° C. to about 88° C. and ranging from greater than about 18% by weight up to about 45% by weight of the binder. The ceramic composition is thermoplastically molded into a body which is baked to remove the binder and then sintered.

SN (RD-15,703), "THERMOPLASTIC MOLDING OF CERAMIC POWDER" filed for G. M. Renlund and C. A. Johnson on even date herewith and assigned to the assignee hereof and incorporated herein by reference discloses the production of a thermoplastically moldable ceramic composition comprised of from about 40% to about 60% by volume of a ceramic powder and a binder comprised of an organic acid and a copolymer of ethylene and from greater than about 12 weight % to about 33 weight % vinyl acetate, said organic acid having a melting point ranging from about 44° C. to about 88° C. and ranging from greater than about 18% by weight up to about 45% by weight of the binder. The ceramic composition is thermoplastically molded into a body which is baked to remove the binder and then densified to produce a polycrystalline body having a porosity of less than about 20% by volume.

SN (RD-15,701), "BINDER REMOVAL FROM THERMOPLASTICALLY FORMED SiC ARTICLE" filed by G. M. Renlund and C. A. Johnson on even date herewith and assigned to the assignee hereof and incorporated herein by reference discloses a method of producing a sintered silicon carbide body which comprises forming a thermoplastically moldable ceramic composition comprised of sinterable silicon carbide powder and binder, thermoplastically molding the ceramic composition into a body, embedding the body in nominally spherical particles selected from the group consisting of polycrystalline silicon carbide, carbon-coated polycrystalline silicon carbide, dense free carbon and mixtures thereof, baking the embedded body to remove the binder therefrom, recovering the baked body and sintering the baked body.

The invention is further illustrated by the following Examples:

EXAMPLE 1

In this example, spray drying was used to produce the present polycrystalline SiC spherical particles.

Approximately 7 Kg of submicron beta-SiC powder containing approximately 1.0 weight % of excess free carbon was mixed with approximately 0.5 weight % of boron powder and was ball milled for about 16 hours at ambient temperature in an aqueous/alcohol solution of binder in a ratio of about 1.50 cc solution/gram of silicon carbide powder.

The liquid medium used in forming the solution was comprised of 63.2% by weight of water and 36.8% by weight of methanol. The binder was comprised of a mixture of methylcellulose sold under the trademark Methocel-Grade A25 and polyethylene glycol sold under the trademark Carbowax-Grade 3350. The binder was dissolved in the liquid medium in an amount based on the silicon carbide powder, i.e. methylcellulose in an amount of 1.25% by weight of SiC and polyethyleneglycol in an amount of 0.75% by weight of SiC.

The resulting slurry was uniform and contained 40.6% by weight solids. The slurry contained sinterable silicon carbide powder which had an average particle size which was submicron.

Conventional spray drying equipment was used. The inlet air temperature of the spray dryer was about 350° C. and the outlet air temperature was about 120° C. The feed rate of the slurry into the spray dryer was 750 grams of slurry per minute. The liquid in the droplets of slurry in the spray dryer evaporated completely before hitting the spray dryer wall producing spray dried agglomerates. About 98% by volume of the resulting spray dried agglomerates were spherical or nominally spherical.

The agglomerates were sieved and about 98% by volume were found to have the following size distribution:

| Screen Size Mesh | Agglomerate diameter μ | Amount % by weight |
| --- | --- | --- |
| >100 <70 | 149 to 210 | 0.10 |
| >140 <100 | 105 to 149 | 7.19 |
| >200 <140 | 74 to 105 | 46.11 |
| >325 <200 | 44 to 74 | 35.27 |
| >400 <325 | 37 to 44 | 1.97 |
| <400 | <37 | 9.36 |

Aproximately 2 Kg of the spray dried agglomerates was poured into a 2 liter pyrex beaker. The beaker was placed in a vacuum oven which was heated at 10° C. per hour to 500° C., held for 10 hours and furnace cooled to ambient temperature. This low temperature firing was carried out to thermally decompose and remove the binder. Specifically, the binder decomposed producing gaseous product of decomposition which vaporized away leaving free carbon in an amount of less than about 0.1% by weight of the silicon carbide.

The resulting spherical agglomerates were poured into a carbon crucible to a depth of about 25 cm and placed in a carbon resistance heated furnace. The furnace was heated to approximately 2100° C. over a period of approximately 6 hours, held at the maximum temperature for 30 minutes, and furnace cooled to ambient temperature, all in helium at a pressure of approximately 0.5 atmosphere.

The resulting mass of densified spherical SiC particles was removed from the crucible, hand crushed to break the bonds between spheres, and screened through a 100 mesh screen. The average diameter of the densified spheres was approximately 50 microns with occasional particles as small as 10 and as large as 200 microns.

The resulting polycrystalline silicon carbide particles were flowable and about 98% by volume were spherical or nominally spherical. These polycrystalline particles were composed of silicon carbide, free carbon in a detectable amount of less than about 0.5% by weight of silicon carbide and boron in an amount estimated based on other work above 0.2% but less than about 0.5% by weight of silicon carbide. These polycrystalline particles would be useful as a catalyst support bed and as heat exchange media.

The density of the spheres was estimated at greater than about 95 percent of the theoretical density of silicon carbide from the polished cross sectional microstructure of the particles. The polished sections were achieved by mixing the particles with a metallographic mounting material, allowing the resin to set, and polishing the resulting mixture.

EXAMPLE 2

1000 g of submicron size silicon carbide powder containing about 0.7% by weight free carbon was added to 6 g of amorphous boron powder and 1.5 liters of water. The slurry was ball milled for 3 hours and dried in an open pan in an oven. The cake was broken up, dry milled for about 20 minutes and screened as dry powder through a 40 mesh screen.

About 250 grams of the resulting processed powder was placed in a plastic cylindrical jar 200 mm wide and 150 mm deep mounted on a shaft inclined about 30 degrees from horizontal. The jar was rotated about its axis at about 60 r.p.m. The cascading powder was then sprayed with a mist of water from a spray gun until small agglomerates started to form. At this point the spraying was interrupted and about 20 grams of the dry processed powder was added. The steps of spraying and adding powder were repeated in about 5 minute intervals until the whole mass in the rotating jar was agglomerated into spherical particles. After the last addition of processed powder, the jar was spun for 30 minutes to obtain good packing and spheroidization of the particles.

The resulting agglomerates were spherical and flowable. They were removed from the jar and screened through 8 and 12 mesh screens to obtain three fractions. The undersize fraction amounted to 35% of the total and was returned to the rotating jar. The oversize fraction was dried and returned to the dry milling step. The intermediate fraction amounting to 45% of the total was dried in an oven at about 100° C. The dried agglomerates had a density of roughly about 50% of theoretical. They were placed in an open carbon crucible to a depth of about 2.5 cm and fired in a carbon resistor furnace at 2100° C. in a vacuum of about 0.1 torr for 30 minutes and then furnace cooled to ambient temperature.

The product was comprised of polycrystalline SiC spherical particles with a diameter ranging from about 1200$\mu$ to about 2000$\mu$. The spherical particles were flowable and were comprised of silicon carbide, free carbon in a detectable amount of less than about 0.7% by weight of the silicon carbide and boron estimated based on other work in an amount of above 0.2% but less than about 0.6% by weight of the silicon carbide.

The spherical particles were useful as milling media in an attritor mill. They would also be useful in a fluidized bed heat exchanger.

The density of the sintered polycrystalline particles was estimated between 90% and 95% of the theoretical density of silicon carbide by preparing a metallographic section.

What is claimed is:

1. A process for producing sintered spherical or nominally spherical particles of polycrystalline silicon carbide having a density greater than 80% of the theoretical density for silicon carbide and having a diameter ranging from about 5 microns to about 2000 microns which consists essentially of forming a slurry consisting essentially of sinterable silicon carbide powder and a liquid medium which has no significantly deleterious effect thereon, said sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of a carbonaceous organic material which completely decomposes at a temperature ranging from 50° C. up to 450° C. to free carbon and gaseous product of decomposition, and mixtures thereof with free carbon, spray drying said slurry into spherical or nominally spherical agglomerates, at least a portion of said carbonaceous organic material being an agglomerate-forming binder in solution and/or suspension in said liquid medium in said slurry and being present in an amount at least sufficient to form said agglomerate and being at least about 1% by weight of said agglomerate, and sintering said agglomerates at a temperature ranging from about 1900° C. to about 2300° C. at about or below atmospheric pressure in a vacuum or atmosphere which has no significant deleterious effect thereon, said agglomerates being of a size which produces said sintered particles, said slurry being characterized as sprayable into droplets into a hot air spray dryer wherein said droplets are dried into said spherical or nominally spherical agglomerates.

2. The process according to claim 1 wherein said agglomerates are prefired at a temperature ranging up to about 300° C. in air thermally decomposing said binder and removing gaseous product of decomposition therefrom.

3. The process according to claim 1 wherein said agglomerates are prefired in a vacuum or in an atmosphere in which they are inert at a temperature below said sintering temperature thermally decomposing said binder and removing gaseous product of decomposition therefrom.

4. A process for producing sintered spherical or nominally spherical particles of polycrystalline silicon carbide having a density greater than 80% of the theoretical density for silicon carbide and having a diameter ranging from about 5 microns to about 2000 microns which consists essentially of forming a slurry comprised of sinterable silicon carbide powder, a liquid medium and an agglomerate-forming binder in solution and/or suspension in said liquid medium, said sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of free carbon, a carbonaceous organic material which completely decomposes at a temperature ranging from 50° C. up to 450° C. to free carbon and gaseous product of decomposition, and mixtures thereof, spraying said slurry into droplets into a spray dryer wherein said droplets are dried into spherical or nominally spherical agglomerates, said agglomerate-forming binder being present in an amount of at least about 1% by weight of said agglomerate and at least sufficient to form said agglomerate, said agglomerate-forming binder being thermally removable at an elevated temperature ranging up to 450° C. leaving no significant amount thereof, and sintering said agglomerates at a temperature ranging from about 1900° C. to about 2300° C. at about or below atmospheric pressure in a vacuum or atmosphere which has no significant deleterious effect thereon, said agglomerates being of a size which produces said sintered particles, said slurry being characterized as sprayable into droplets into a hot air spray dryer wherein said droplets are dried into spherical or nominally spherical agglomerates.

5. The process according to claim 4 wherein said agglomerates are prefired at a temperature ranging up to about 300° C. in air thermally decomposing said binder and removing gaseous product of decomposition therefrom.

6. The process according to claim 4 wherein said agglomerates are prefired in a vacuum or in an atmosphere in which they are inert at a temperature below said sintering temperature thermally decomposing said binder and removing gaseous product of decomposition therefrom.

7. A process for producing sintered spherical or nominally spherical particles of polycrystalline silicon carbide having a density greater than 80% of the theoretical density for silicon carbide and having a diameter ranging from about 100 microns to about 10,000 microns which consists essentially of cascading or rolling sinterable silicon carbide powder and contacting said powder with an effective amount of a spray or mist of liquid to produce spherical or nominally spherical agglomerates, said sinterable silicon carbide powder having an average particle size which is submicron and which consists essentially of silicon carbide, a boron additive selected from the group consisting of boron and boron carbide in an amount equivalent to from about 0.3% by weight to about 3% by weight of boron based on said silicon carbide, and an amount of a carbonaceous additive equivalent to from about 0.1% by weight to about 5% by weight of free carbon based on said silicon carbide, said carbonaceous additive being selected from the group consisting of free carbon, a carbonaceous organic material which completely decomposes at a temperature ranging from 50° C. up to 450° C. to free carbon and gaseous product of decomposition, and mixtures thereof, and sintering said spherical or nominally spherical agglomerates at a temperature ranging from about 1900° C. to about 2300° C. at or below atmospheric pressure in a vacuum or atmosphere which has no significant deleterious effect thereon, said spherical or nominally spherical agglomerates being of a size which produces said sintered particles.

8. The process according to claim 7 wherein said liquid is water.

9. A polycrystalline spherical or nominally spherical particle having a density greater than 80% of the theoretical density for silicon carbide and consisting essentially of silicon carbide, from about 0.2 part to about 3 parts by weight of boron based on 100 parts by weight of silicon carbide, and up to about 5 parts by weight of free uncombined carbon based on 100 parts by weight of silicon carbide, said polycrystalline particle ranging in diameter from about 5 microns to about 10,000 microns.

10. The particle according to claim 9 wherein said silicon carbide is α-silicon carbide.

11. The particle according to claim 9 wherein said silicon carbide is β-silicon carbide.

12. The particle according to claim 9 wherein said silicon carbide is a mixture of α- and β-silicon carbide.

13. Particles according to claim 9 having an average diameter ranging from about 10 microns to about 5000 microns.

14. Particles according to claim 9 having a diameter ranging from about 5 microns to about 2000 microns and having an average diameter ranging from about 10 microns to about 1000 microns.

15. Particles according to claim 9 having a diameter ranging from about 100 microns to about 10,000 microns and having an average diameter ranging from about 250 microns to about 5000 microns.

16. A polycrystalline spherical or nominally spherical particle having a density greater than 80% of the theoretical density for silicon carbide and consisting essentially of silicon carbide, from about 0.3 part to about 3 parts by weight of boron based on 100 parts by weight of silicon carbide, and from a detectable amount up to about 5 parts by weight of free uncombined carbon based on 100 parts by weight of silicon carbide, said polycrystalline particle ranging in diameter from about 5 microns to about 10,000 microns.

17. The particle according to claim 16 wherein said silicon carbide is α-silicon carbide.

18. The particle according to claim 16 wherein said silicon carbide is β-silicon carbide.

19. The particle according to claim 16 wherein said silicon carbide is a mixture of α- and β-silicon carbide.

20. Particles according to claim 16 having an average diameter ranging from about 10 microns to about 5000 microns.

21. Particles according to claim 16 having a diameter ranging from about 5 microns to about 2000 microns and having an average diameter ranging from about 10 microns to about 1000 microns.

22. Particles according to claim 16 having a diameter ranging from about 100 microns to about 10,000 microns and having an average diameter ranging from about 250 microns to about 5000 microns.

23. The process according to claim 7 wherein said sinterable silicon carbide powder is in the form of agglomerates.

24. The process according to claim 7 wherein said sinterable silicon carbide powder is in the form of agglomerates and said liquid is water.

25. The process according to claim 7 wherein said sinterable silicon carbide powder is in the form of spray dried agglomerates, said spray dried agglomerates consisting essentially of said sinterable silicon carbide powder with at least a portion of said carbonaceous organic material being an agglomerate-forming binder present in an amount at least sufficient to form said spray dried agglomerate and being at least about 1% by weight of said spray dried agglomerate.

26. The process according to claim 7 wherein said sinterable silicon carbide powder is in the form of spray dried agglomerates and said liquid is water, said spray dried agglomerates consisting essentially of said sinterable silicon carbide powder with at least a portion of said carbonaceous organic material being an agglomerate-forming binder present in an amount at least sufficient to form said spray dried agglomerate and being at least about 1% by weight of said spray dried agglomerate.

27. The process according to claim 7 wherein said sinterable silicon carbide powder is in the form of spray dried agglomerates, said spray dried agglomerates consisting essentially of said sinterable silicon carbide powder and agglomerate-forming binder, said agglomerate-forming binder being present in an amount of at least about 1% by weight of said agglomerate and at least sufficient to form said agglomerate, said agglomerate-forming binder being thermally removable at an elevated temperature ranging up to 450° C. leaving no significant amount thereof.

28. The process according to claim 7 wherein said sinterable silicon carbide powder is in the form of spray dried agglomerates and said liquid is water, said spray dried agglomerates consisting essentially of said sinterable silicon carbide powder and agglomerate-forming binder, said agglomerate-forming binder being present in an amount of at least about 1% by weight of said agglomerate and at least sufficient to form said agglomerate, said agglomerate-forming binder being thermally removable at an elevated temperature ranging up to 450° C. leaving no significant amount thereof.

29. The process according to claim 7 wherein agglomerates are cascaded or rolled with said sinterable silicon carbide powder and contacted with an effective amount of spray or mist of liquid to produce spherical or nominally spherical agglomerates, said agglomerates being selected from the group consisting of agglomerates of said sinterable silicon carbide powder; first spray dried agglomerates consisting essentially of said sinterable silicon carbide powder with at least a portion of said carbonaceous organic material being an organic agglomerate-forming binder present in an amount at least sufficient to form said first spray dried agglomerate and being at least about 1% by weight of said first spray dried agglomerate; second spray dried agglomerates consisting essentially of said sinterable silicon carbide powder and agglomerate-forming binder, said agglomerate-forming binder being present in an amount of at least about 1% by weight of said second spray dried agglomerate and at least sufficient to form said second spray dried agglomerate, said agglomerate-forming binder being thermally removable at an elevated temperature ranging up to 450° C. leaving no significant amount thereof; and mixtures thereof.

30. The process according to claim 7 wherein agglomerates are cascaded or rolled with said sinterable silicon carbide powder and contacted with an effective amount of spray or mist of water to produce spherical or nominally spherical agglomerates, said agglomerates being selected from the group consisting of agglomerates of said sinterable silicon carbide powder; first spray dried agglomerates consisting essentially of said sinterable silicon carbide powder with at least a portion of said carbonaceous organic material being an organic agglomerate-forming binder present in an amount at least sufficient to form said first spray dried agglomerate and being at least about 1% by weight of said first spray dried agglomerate; second spray dried agglomerates consisting essentially of said sinterable silicon carbide powder and agglomerate-forming binder, said agglomerate-forming binder being present in an amount of at least about 1% by weight of said second spray dried agglomerate and at least sufficient to form said second spray dried agglomerate, said agglomerate-forming binder being thermally removable at an elevated temperature ranging up to 450° C. leaving no significant amount thereof; and mixtures thereof.

* * * * *